United States Patent
Fetting, Jr. et al.

(10) Patent No.: US 7,296,668 B2
(45) Date of Patent: Nov. 20, 2007

(54) OVERRUNNING CLUTCH HAVING SNAP RING SECURED THRUST PLATE

(75) Inventors: Robert D. Fetting, Jr., Caro, MI (US); Gregory M. Eisengruber, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 205 days.

(21) Appl. No.: 11/201,482

(22) Filed: Aug. 11, 2005

(65) Prior Publication Data

US 2007/0034470 A1    Feb. 15, 2007

(51) Int. Cl.
*F16D 41/12* (2006.01)
(52) U.S. Cl. .................. 192/46; 192/69.1; 192/113.32
(58) Field of Classification Search ............... 192/69.1, 192/113.32; 384/368
See application file for complete search history.

(56) References Cited

U.S. PATENT DOCUMENTS

| | | | |
|---|---|---|---|
| 2,552,166 A * | 5/1951 | Gardiner ..................... 384/425 |
| 4,757,887 A * | 7/1988 | Ostrander et al. ......... 192/45.1 |
| 4,913,271 A * | 4/1990 | Kinoshita et al. ...... 192/113.32 |
| 5,769,196 A * | 6/1998 | Murata .................. 192/113.32 |
| 5,918,715 A | 7/1999 | Ruth et al. |
| 6,533,461 B2 * | 3/2003 | Gottlieb ..................... 384/420 |
| 6,739,440 B1 | 5/2004 | Dick |
| 7,100,756 B2 * | 9/2006 | Kimes et al. .................. 192/46 |
| 7,223,198 B2 * | 5/2007 | Kimes et al. ............... 475/331 |

* cited by examiner

Primary Examiner—Rodney H. Bonck
(74) Attorney, Agent, or Firm—Brooks Kushman P.C.

(57) ABSTRACT

An overrunning clutch (24) has first and second clutch members (30, 32) having coupling faces (34) and (36) between which spring biased pivotal struts (40) and locking formations (44) cooperate to prevent relative rotation in only one direction. A snap ring (48) and thrust plate (50) cooperate to axially secure the clutch members (30) and (32) to each other and the thrust plate has a retainer (52) projecting therefrom to prevent rotation. The retainer (52) in certain embodiments is received between ends (58) of the snap ring (48) to prevent thrust plate rotation.

17 Claims, 4 Drawing Sheets

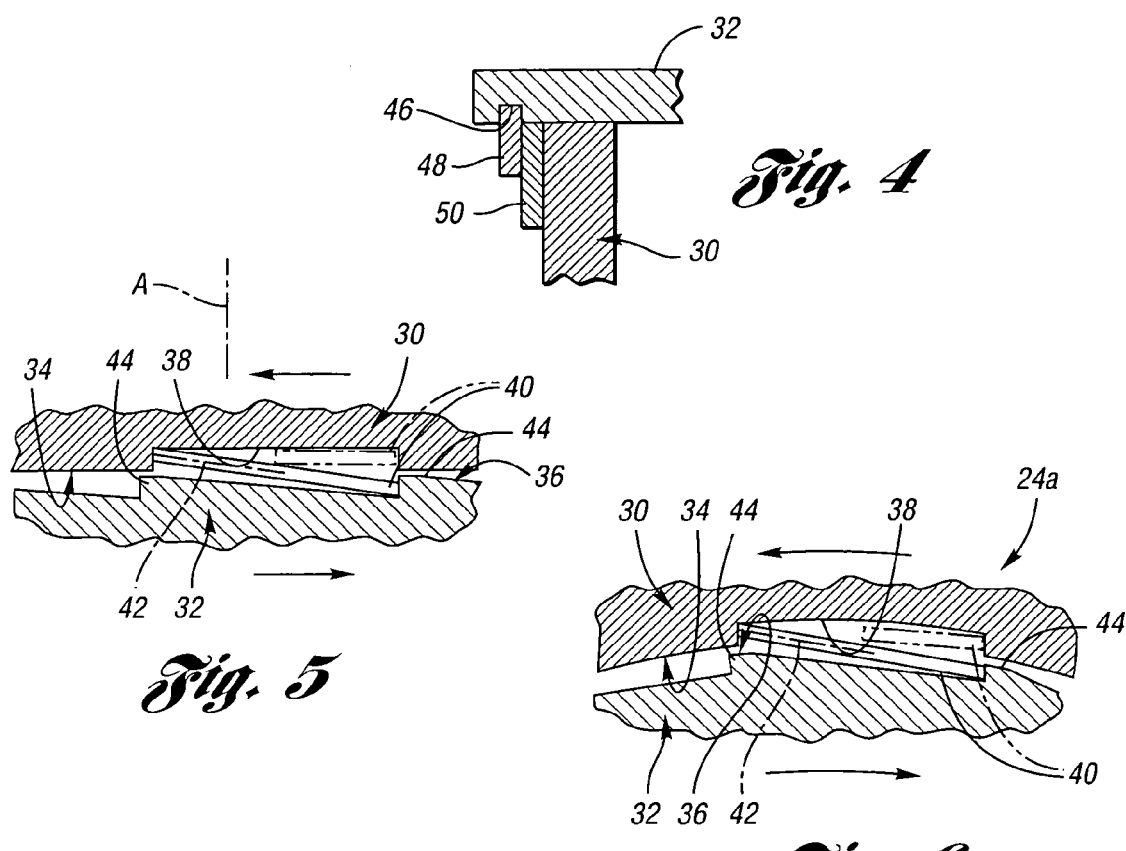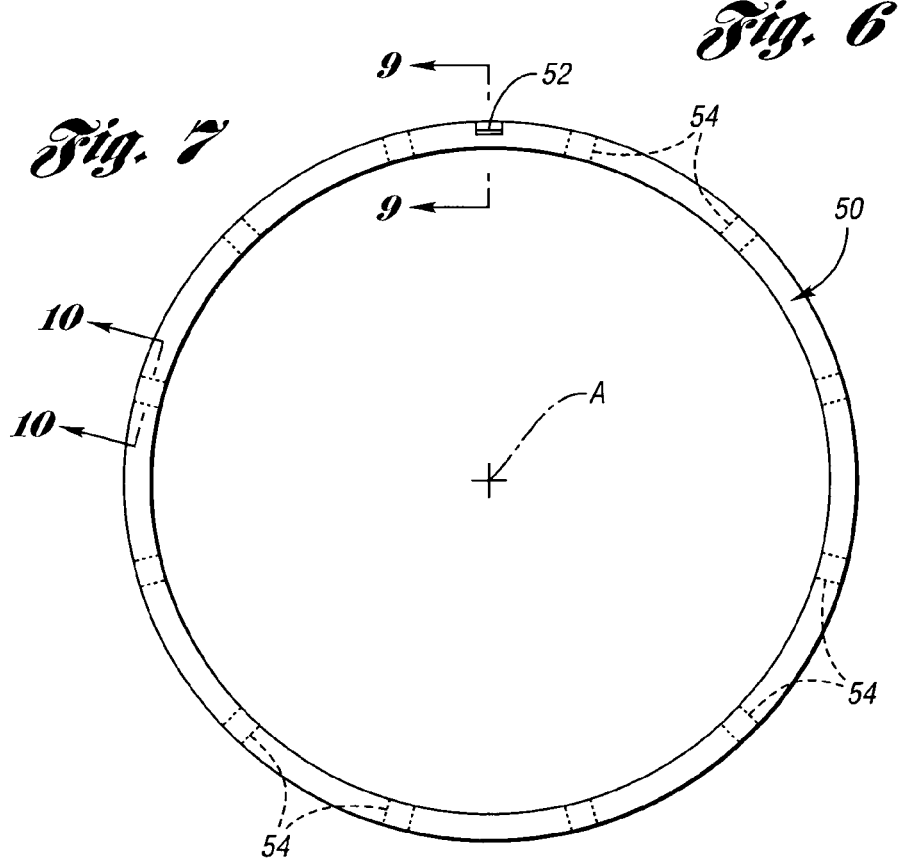

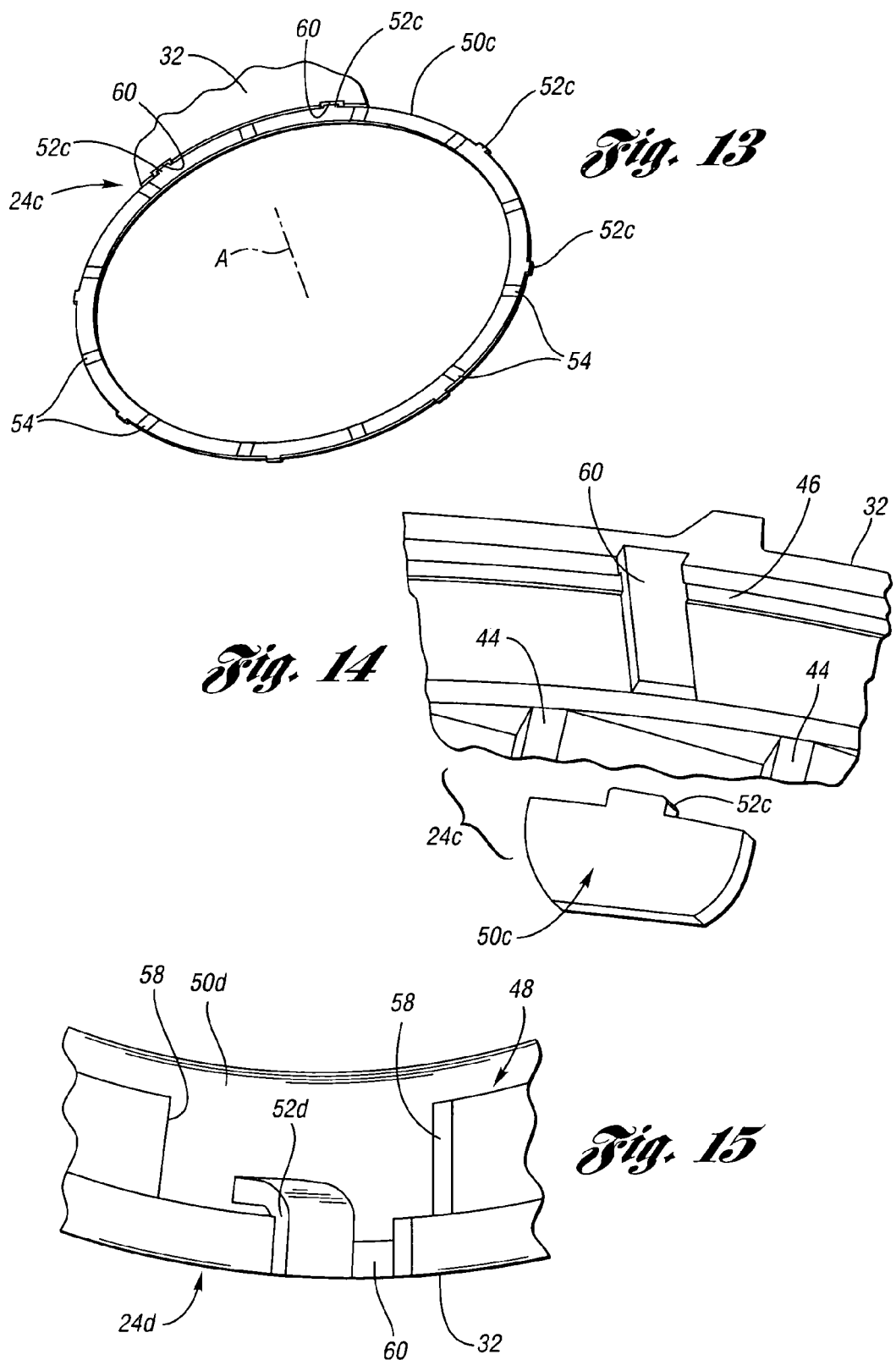

OVERRUNNING CLUTCH HAVING SNAP RING SECURED THRUST PLATE

BACKGROUND OF THE INVENTION

1. Field of the Invention

This invention relates to an overrunning clutch having first and second annular clutch members that are selectively prevented from relative rotation in one direction and axially separated by an annular thrust plate that is secured by a snap ring.

2. Background Art

Overrunning clutches conventionally include first and second annular clutch members that are supported for relative rotation with respect to each other about a common rotational axis. Opposed coupling faces of the first and second clutch members are provided with one coupling face having strut pockets that receive spring biased struts and with the other coupling face having locking formations so that the relative rotation of the members can be provided in one direction but not in the other direction. The coupling faces can be axially oriented as disclosed by U.S. Pat. No. 5,918,715 Ruth et al. or radially oriented as disclosed by U.S. Pat. No. 6,739,440 Dick. A snap ring is conventionally utilized to axially secure the first and second clutch members to each other such that there is necessarily rotational movement between the snap ring and one of the members.

SUMMARY OF THE INVENTION

An object of the present invention is to provide an improved overrunning clutch.

In carrying out the above object, the overrunning clutch of the invention includes first and second annular clutch members that are supported with respect to each other for relative rotation about a common rotational axis, and the first and second clutch members have annular coupling faces that oppose each other. The coupling face of the first clutch member has pockets spaced about the rotational axis. Each pocket has a pivotal strut received thereby, and each pocket also includes a spring that pivotal biases its strut outwardly therefrom for locking. The coupling face of the second clutch member has locking formations that are engaged by the struts upon projecting outwardly from the pockets of the first clutch member to prevent relative rotation of the clutch members with respect to each other in one direction while permitting relative rotation of the clutch members with respect to each other in the opposite direction by pivoting of the struts into the pockets of the first clutch member. One of the clutch members has an annular groove that receives a generally round snap ring. An annular thrust plate is located axially along the rotational axis between the other clutch member and the snap ring. The thrust plate has a first axial face that contacts the snap ring and has a second axial face oriented in the opposite axial direction as the first axial face and contacting only the other clutch member without contacting the one clutch member, and the thrust plate has a retainer projecting therefrom to prevent rotation of the thrust plate.

The coupling faces can be oriented to face axially along the rotational axis or to face radially with respect to the rotational axis.

The thrust plate includes radially extending lubrication passages that are provided by radially extending portions of the thrust plate with reduced thickness.

Different materials can be used to make the thrust plate. In certain embodiments, the thrust plate is a sheet metal stamping made from steel, brass, aluminum, or bronze. In another embodiment, the thrust plate is a synthetic resin molding.

Embodiments of the thrust plate have the retainer projecting axially therefrom along the rotational axis with the snap ring having opposite circumferential ends between which the thrust plate retainer is received to prevent thrust plate rotation. One of these embodiments is a sheet metal stamping from which the retainer extends axially along the rotational axis to between the opposite circumferential ends of the snap ring. More specifically, the thrust plate retainer of this embodiment extends axially at an oblique angle to the rotational axis. In another of these embodiments, the thrust plate is a synthetic resin molding defining the axially projecting retainer received between the circumferential ends of the snap ring.

In other embodiments, the one clutch member has a circumferential groove, and the retainer of the annular thrust plate extends radially into the circumferential groove of the one clutch member to prevent thrust plate rotation. One of these embodiments has the one clutch member provided with a plurality of the circumferential grooves spaced circumferentially from each other about the rotational axis, and the annular thrust plate includes a plurality of the radially extending retainers spaced circumferentially from each other about the rotational axis and respectively received by the circumferential grooves in the one clutch member to cooperate with each other to prevent thrust plate loading. Another of these embodiments has the thrust plate retainer extending to the circumferential groove between the opposite circumferential ends of the snap ring.

The objects, features and advantages of the present invention are readily apparent from the following detailed description of the preferred embodiments when taken in connection with the accompanying drawings.

BRIEF DESCRIPTION OF THE DRAWINGS

FIG. 4 is an enlarged view of a portion of FIG. 1 illustrating a snap ring and annular thrust plate that are utilized to axially secure the clutch members shown in FIGS. 2 and 3 in their assembled condition of FIG. 1.

FIG. 5 is a partial view illustrating flat axial coupling faces of the clutch members at which spring biased pivotal struts and locking formations cooperate to prevent relative rotation of the clutch members in one direction while permitting relative rotation in the opposite direction.

FIG. 6 is a view similar to FIG. 5 but showing the clutch members with radial coupling faces at which spring biased pivotal struts and locking formations cooperate to prevent relative rotation in one direction while permitting relative rotation in the opposite direction.

FIG. 7 is an axial view of the annular thrust plate.

FIG. 13 is a perspective view of another embodiment of the annular thrust plate which has circumferentially extending retainers.

FIG. 14 is a partial exploded perspective view illustrating the manner in which the circumferentially extending retainers of the FIG. 13 thrust plate are aligned with circumferential grooves in one of the clutch members and received thereby to prevent thrust plate during rotation.

FIG. 15 is a partial perspective view of another embodiment wherein the annular thrust plate extends axially between opposite circumferential ends of the snap ring and into a circumferential groove of one of the clutch members.

DETAILED DESCRIPTION OF THE PREFERRED EMBODIMENTS

Figure 1:
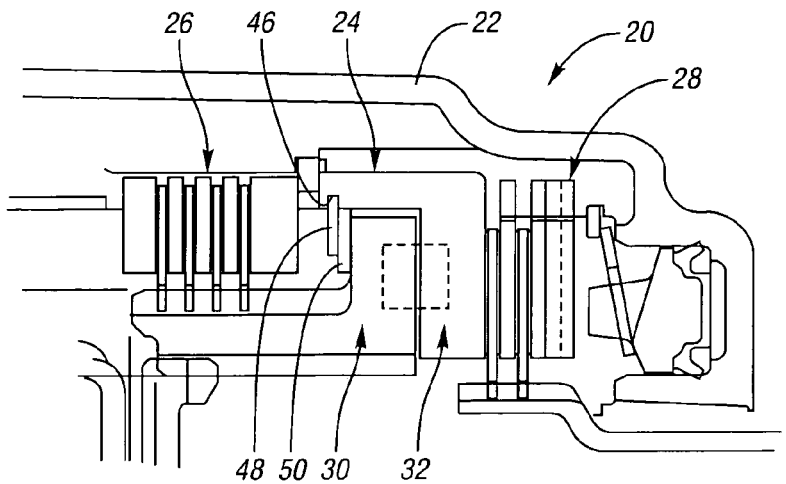
FIG. 1 is a partial sectional view taken through a portion of a transmission which includes an overrunning clutch constructed in accordance with the present invention.
Figure 2:
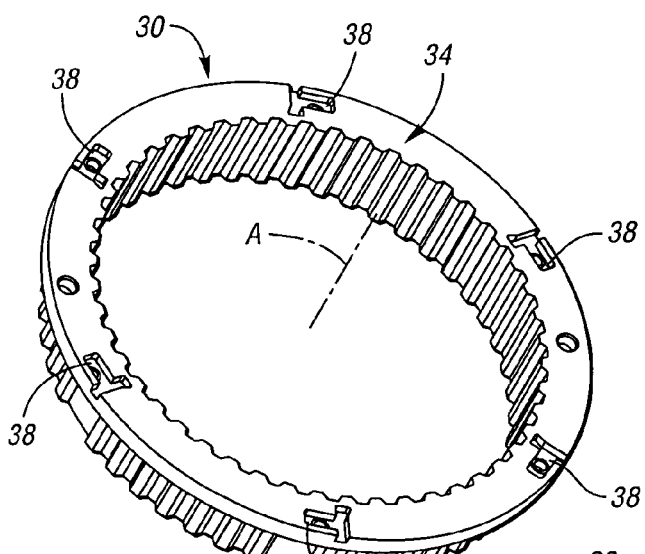
FIG. 2 is a perspective view of one annular clutch member of the clutch.
Figure 3:
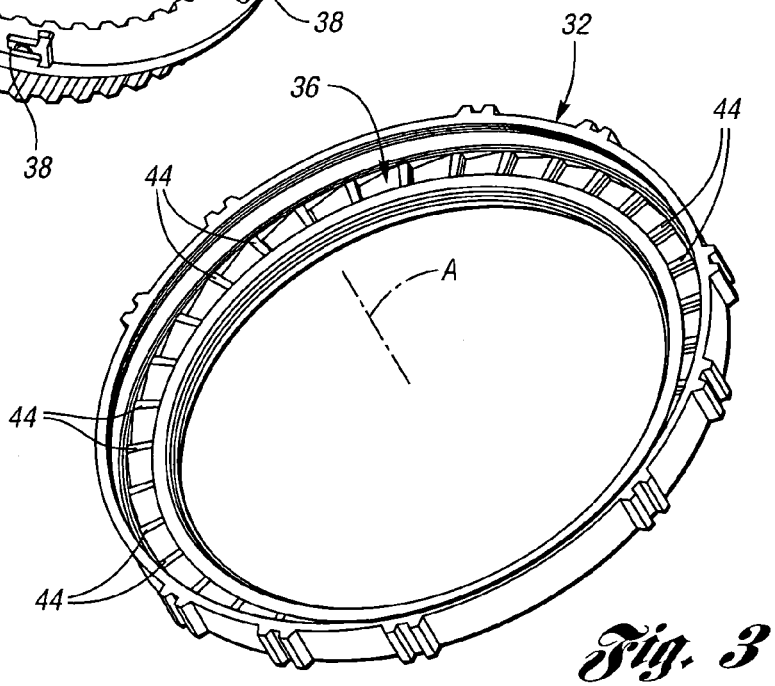
FIG. 3 is a perspective view of another annular clutch member of the clutch.
Figure 8:
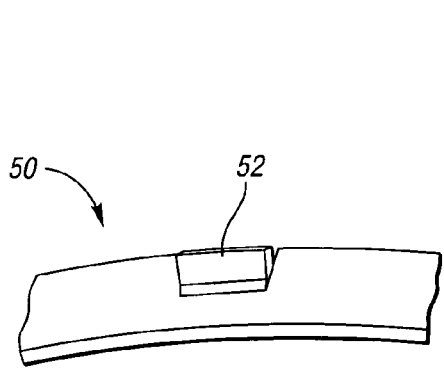
FIG. 8 is a perspective view of a portion of the thrust plate showing a retainer that prevents thrust plate rotation.
Figure 9:
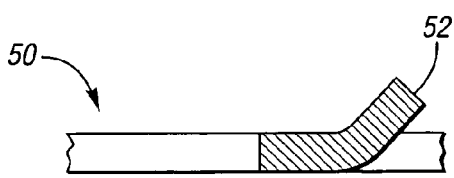
FIG. 9 is a sectional view taken along the direction of line 9-9 in FIG. 7 to further illustrate the retainer.

With reference to FIG. 1, a transmission generally indicated by 20 includes a housing 22 which receives an overrunning clutch 24 that is constructed in accordance with the present invention and utilized with control clutches 26 and 28 to control torque transmission. The overrunning clutch 24 of the invention includes first and second annular clutch members 30 and 32 that are respectively shown in FIGS. 2 and 3 and are supported with respect to each other for relative rotation about a common rotational axis A. The first and second clutch members 30 and 32 have respective coupling faces 34 and 36 which are shown as facing axially along the rotational axis A as also shown in FIG. 5. It should be appreciated that the coupling faces can also be oriented to face radially with respect to the rotational axis as shown by the embodiment of clutch 24a in FIG. 6.

The coupling face 34 of the clutch member 30 has pockets 38, six as shown, spaced circumferentially about the rotational axis A. Each pocket as shown in FIG. 5 includes a pivotal strut 40 received thereby, and each pocket also includes a spring 42 that pivotally biases its strut outwardly therefrom for locking, as shown by solid line representation, while permitting movement back into the pocket as partially shown by phantom line representation to permit relative rotation between the clutch members.

The coupling face 36 of the second clutch member 32 has locking formations 44 that are engaged by the struts upon projecting outwardly from the pocket 48 of the first clutch member 30 to prevent relative rotation of the clutch members with respect to each other while permitting relative rotation of the clutch members with respect to each other in the opposite direction shown by the arrows, which is permitted by pivoting of the struts 40 into the pockets 38 against the bias of the associate spring 42. It should be understood that the relative rotation can include rotation of both clutch members or rotation of only one of the clutch members while the other is held from rotation.

As illustrated in FIG. 4, clutch member 32 has an annular groove 46 that receives a snap ring 48 of a generally annular shape. An annular thrust plate 50 is located axially along the rotational axis between the clutch member 30 and the snap ring 48. The thrust plate 50 has a first axial face that contacts the snap ring 48 and has a second axial face oriented in the opposite axial direction as the first axial face and contacting only the clutch member 30 without contacting the clutch member 32. Furthermore, the thrust plate 50 as shown in FIGS. 7-11 has a retainer 52 projecting therefrom to prevent rotation of the thrust plate.

Figure 10:
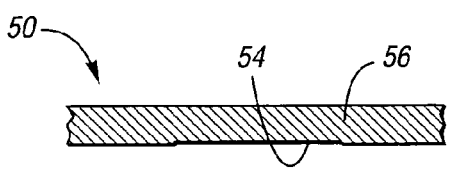
FIG. 10 is a partial sectional view taken along the direction of line 10-10 in FIG. 7 to illustrate reduced thickness portions of the thrust plate for providing lubrication passages.

As shown in FIGS. 7 and 10, the thrust plate 50 includes a plurality of circumferentially spaced lubrication passages 54 that extend radially and are provided as shown in FIG. 10 by portions 56 of reduced thickness of the thrust plate. These lubrication passages 54 as shown are provided on the opposite side of thrust plate from which the retainer 52 projects. Also, each of the other embodiments of the thrust plate as hereinafter more fully described also has radial lubrication passages provided by reduced thickness portions of the thrust plate.

The thrust plate embodiment 50 shown in FIGS. 7-11 is a sheet metal stamping made from a metal such as steel, brass, aluminum or bronze. As is hereinafter described in connection with FIG. 12, it is also possible to make the thrust plate as a synthetic resin molding.

Figure 11:
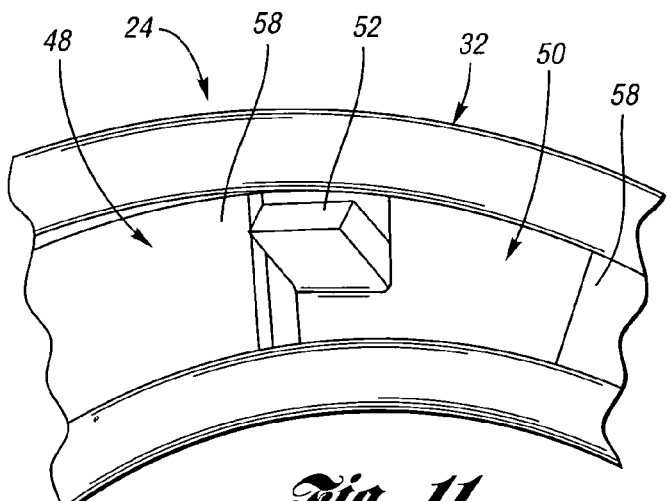
FIG. 11 is a partial perspective view showing the manner in which the thrust plate retainer is received between opposite circumferential ends of the snap ring.

As best illustrated in FIG. 11, the snap ring 48 has opposite circumferential ends 58 that are spaced from each other and between which the thrust plate retainer 52 is received to prevent thrust plate rotation. More specifically, the sheet metal thrust plate is stamped to provide the retainer 52 which extends axially with respect to the rotational axis A at an oblique angle.

Figure 12:
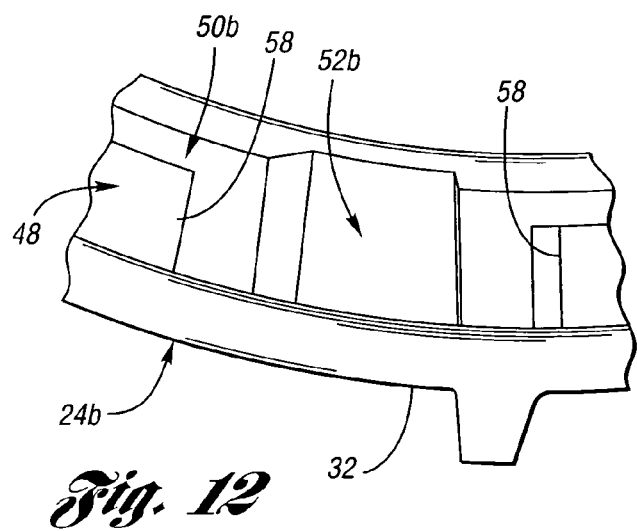
FIG. 12 is a partial perspective view of another embodiment wherein the annular thrust plate is made from a synthetic resin and has an axially projecting retainer received between opposite circumferential ends of the snap ring.

In another embodiment of the clutch 24b shown in FIG. 12, the thrust plate 50b is molded from a synthetic resin and has an axially projecting retainer 52b that is also received between the circumferential opposite ends 58 of the snap ring 48 so as to prevent thrust plate rotation.

In another embodiment illustrated in FIGS. 13 and 14, the clutch 24c the clutch member 32 has circumferential grooves 60, and the annular thrust plate 50c as shown in FIG. 13 includes a plurality of the radially extending retainers 52c respectively received within associated grooves 60 of the clutch member 32. These radially extending retainers 52c like the lubrication passages 54 are spaced circumferentially from each other about the central axis A.

With reference to FIG. 15, another embodiment of the clutch 24d has its thrust plate 50d made from sheet metal with a stamped retainer 52d that extends between the snap ring ends 58 and is received by a circumferential groove 60 in the clutch member 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention as defined by the following claims.

What is claimed is:

1. An overrunning clutch comprising:

first and second annular clutch members that are supported with respect to each other for relative rotation about a common rotational axis, and the first and second clutch members having annular coupling faces that oppose each other;

the coupling face of the first clutch member having pockets spaced about the rotational axis, each pocket having a pivotal strut received thereby, and each pocket including a spring that pivotal biases its strut outwardly therefrom for locking;

the coupling face of the second clutch member having locking formations that are engaged by the struts upon projecting outwardly from the pockets of the first clutch member to prevent relative rotation of the clutch members with respect to each other in one direction while permitting relative rotation of the clutch members with respect to each other in the opposite direction by pivoting of the struts into the pockets of the first clutch member;

one of the clutch members having an annular groove;

a generally round snap ring that is received by the annular groove in the one clutch member; and an annular thrust plate located axially along the rotational axis between the other clutch member and the snap ring, the thrust plate having a first axial face that contacts the snap ring and having a second axial face oriented in the opposite axial direction as the first axial face and contacting only the other clutch member without contacting the one clutch member, and the thrust plate having a retainer projecting therefrom to prevent rotation of the thrust plate.

2. An overrunning clutch as in claim 1 wherein coupling faces are oriented to face axially along the rotational axis.

3. An overrunning clutch as in claim 1 wherein the coupling faces are oriented to face radially with respect to the rotational axis.

4. An overrunning clutch as in claim 1 wherein the thrust plate includes radially extending lubrication passages.

5. An overrunning clutch as in claim 4 wherein the thrust plate includes radially extending portions of reduced thickness that define the radially extending lubrication passages.

6. An overrunning clutch as in claim 1 wherein the thrust plate is a sheet metal stamping.

7. An overrunning clutch as in claim 6 wherein the thrust plate is stamped from a metal selected from the group consisting of steel, brass, aluminum, and bronze.

8. An overrunning clutch as in claim 1 wherein the thrust plate is a synthetic resin molding.

9. An overrunning clutch as in claim 1 wherein the retainer of the thrust plate projects axially therefrom along the rotational axis, and the snap ring having opposite circumferential ends between which the thrust plate retainer is received to prevent thrust plate rotation.

10. An overrunning clutch as in claim 9 wherein the thrust plate is a sheet metal stamping from which the retainer extends axially along the rotational axis to between the opposite circumferential ends of the snap ring.

11. An overrunning clutch as in claim 10 wherein the thrust plate retainer extends axially at an oblique angle to the rotational axis.

12. An overrunning clutch as in claim 9 wherein the thrust plate is a synthetic resin molding defining the axially projecting retainer received between the circumferential ends of the snap ring.

13. An overrunning clutch as in claim 1 wherein the one clutch member has a circumferential groove, the retainer of the annular thrust plate extending radially into the circumferential groove of the one clutch member to prevent thrust plate rotation.

14. An overrunning clutch as in claim 13 wherein the one clutch member includes a plurality of the circumferential grooves spaced circumferentially from each other about the rotational axis, and the annular thrust plate including a plurality of the radially extending retainers spaced circumferentially from each other about the rotational axis and respectively received by the circumferential grooves in the one clutch member to cooperate with each other to prevent thrust plate rotation.

15. An overrunning clutch as in claim 13 wherein the snap ring has opposite circumferential ends between which the thrust plate retainer is received to also prevent thrust plate rotation.

16. An overrunning clutch comprising:

first and second annular clutch members that are supported with respect to each other for relative rotation about a common rotational axis, and the first and second clutch members having annular coupling faces that axially oppose each other;

the coupling face of the first clutch member having pockets spaced about the rotational axis, each pocket having a pivotal strut received thereby, and each pocket including a spring that pivotal biases its strut outwardly therefrom for locking;

the coupling face of the second clutch member having locking formations that are engaged by the struts upon projecting outwardly from the pockets of the first clutch member to prevent relative rotation of the clutch members with respect to each other in one direction while permitting rotation of the clutch members with respect to each other in the opposite direction by pivoting of the struts into the pockets of the first clutch member;

one of the clutch members having an annular groove;

a generally round snap ring that is received by the annular groove in the one clutch member, and the snap ring having circumferentially spaced opposite ends; and an annular thrust plate located axially along the rotational axis between the other clutch member and the snap ring, and the thrust plate having an axially extending retainer projecting therefrom to between the circumferential spaced opposite ends of the snap ring to prevent rotation of the thrust plate.

17. An overrunning clutch comprising:

first and second annular clutch members that are supported with respect to each other for relative rotation about a common rotational axis, and the first and second clutch members having annular coupling faces that axially oppose each other;

the coupling face of the first clutch member having pockets spaced about the rotational axis, each pocket having a pivotal strut received thereby, and each pocket including a spring that pivotal biases its strut outwardly therefrom for locking;

the coupling face of the second clutch member having locking formations that are engaged by the struts upon projecting outwardly from the pockets of the first clutch member to prevent relative rotation of the clutch members with respect to each other in one direction while permitting rotation of the clutch members with respect to each other in the opposite direction by pivoting of the struts into the pockets of the first clutch member;

one of the clutch members having an annular groove;

a generally round snap ring that is received by the annular groove in the one clutch member, and the snap ring having circumferentially spaced opposite ends; and an annular thrust plate that is stamped from sheet metal and located axially along the rotational axis between the other clutch member and the snap ring, and the sheet metal thrust plate having a stamped retainer extending axially to between the circumferential spaced opposite ends of the snap ring to prevent rotation of the thrust plate.

* * * * *

UNITED STATES PATENT AND TRADEMARK OFFICE
CERTIFICATE OF CORRECTION

PATENT NO. : 7,296,668 B2  Page 1 of 1
APPLICATION NO. : 11/201482
DATED : November 20, 2007
INVENTOR(S) : Robert D. Fetting, Jr. and Gregory M. Eisengruber It is certified that error appears in the above-identified patent and that said Letters Patent is hereby corrected as shown below:

Column 5, Line 2, Claim 1:

Delete "pivot" and insert -- pivotally --.

Column 6, Line 17, Claim 16:

Delete "pivot" and insert -- pivotally --.

Column 6, Line 45, Claim 17:

Delete "pivot" and insert -- pivotally --.

Signed and Sealed this

Third Day of June, 2008

JON W. DUDAS
*Director of the United States Patent and Trademark Office*